Patented Apr. 14, 1931

1,800,987

UNITED STATES PATENT OFFICE

LEWIS B. ESMOND, OF BOSTON, MASSACHUSETTS, AND WERNER W. DUECKER, OF PITTSBURGH, PENNSYLVANIA

METHOD OF PREPARING EDIBLE EMULSIONS OF SOLID IN FAT AND PRODUCT THEREOF

No Drawing.    Application filed March 6, 1929.    Serial No. 344,913.

Our invention relates to the preparation of edible emulsions of solids in fats such as are employed in confectionery, cake icing, and the like, and consists in a modification in the composition and in the method of preparation, in consequence of which the emulsion is stabilized and its quality is improved. We shall first describe our invention in specific application to the preparation of chocolate, and then indicate its wider applicability.

When chocolate or articles containing chocolate, such as chocolate-covered candy, are kept for some time under ordinary store conditions, or when such articles are kept under fluctuating conditions of temperature, the consistency changes; they tend to become granular; and soon lose their initial glossy, shiny appearance and become dull and aged. Sometimes they seem to be covered with a thin white film or bloom. The bloom on chocolate is generally regarded as of two types. It is common, in the preparation of such articles, to incorporate with the chocolate a quantity of wax or fat, ordinarily cocoa butter, in order to prevent or to delay the progress of the undesired granulation; and it is thought that fluctuations of temperature cause some of the fat to crystallize and to appear on the surface as a thin white film. The second type of blooming is thought to be produced upon such articles as contain sugar, as all articles of confectionery do, and is thought to be produced after the articles have been exposed in an atmosphere of rather high humidity. The moisture in the air dissolves superficially the sugar in the chocolate; and, on subsequent evaporation, the sugar remains, crystallized upon the surface. The blooming of chocolate confectionery has hitherto been beyond control, and continues to be a cause of heavy losses to candy manufacturers.

In the preparation of chocolate, cocoa beans cracked into nibs and roasted are crushed in a mill. The whole becomes, under treatment and at the somewhat elevated temperature of operation, a fluid mass, known as "chocolate liquor." To this mass, for the preparation of such products as we have named, cocoa butter is added and, ordinarily, sugar also.

In the practice of our invention, gelatine is incorporated in the chocolate. The nibs produced by cracking roasted cocoa beans may be soaked in a solution of gelatine in water, with or without sugar. The solution will coat and penetrate the nibs. The nibs so treated are dried, and the dried nibs so modified are reduced by crushing to the condition of chocolate liquor, the chocolate liquor containing a gelatine component or ingredient. The following is an exemplary procedure.

One gallon of water is placed in a steam kettle and brought to boiling. To it 25 pounds of sugar then are added. When the consequent sugar solution is boiling briskly 35 pounds of cocoa-bean nibs are added. The mixture is agitated and boiling continued until the nibs have softened. Two and one half pounds of gelatine dissolved in a half gallon of water are then added gradually and stirred into the mass. Agitation and heating continue until the mass is dry and the nibs no longer cling together. The mass then is spread in trays and allowed to cool. When cold the nibs will be found to be covered with a hard, glossy sugar-gelatine coating. The nibs so treated are introduced into the melangeur and there are reduced by crushing and grinding to chocolate liquor. The chocolate liquor may in the melangeur be combined with added quantities of cocoa butter and if need be of unmodified chocolate liquor and of sugar, to produce in otherwise usual manner chocolate in commercial sense of the desired composition. The mass is finished in usual manner.

As we have intimated a portion only of the nibs requisite for the production of a given quantity of chocolate may be treated with gelatine, the quantity of gelatine being sufficient for the intended quantity of chocolate, and in the melangeur the so treated nibs may be crushed with untreated nibs, or combined there with proper quantity of unmodified chocolate liquor to afford the desired quantity of the finished article.

Ordinarily one pound of gelatine will suffice for a total of 8 to 14 pounds of cocoa-bean nibs in the finished article.

Edible gelatine varies widely in grade or quality. We preferably employ gelatine made from calf stock, as neutral as possible in the matter of acidity, and of relatively high gel strength and viscosity. The higher the gel strength the less the quantity of gelatine required. We find it desirable to employ the gelatine when comminuted to such degree of fineness as to pass through a 60-mesh sieve.

The product of our improved process, when compared with the product of the usual process not involving the use of gelatine, possesses these characteristics: Plasticity is increased, and in consequence the covering power, when the material is used as a coating, is increased (actually by as much as 5 to 10%). Crystallization of sugar is retarded, and in consequence the tendency to granulation is diminished. The product of our improved process is superior in smoothness of body, and because of such smoothness of body the milling time may be reduced to an extent as great as one half while the quality of the product is maintained. The surface of the confection or coating is of smoother and more glossy appearance. Both sugar blooming and fat blooming are retarded. And the retardation of fat blooming is particularly noticeable if the sugar content be high.

We claim as our invention:

1. That step in the preparation of chocolate herein described which consists in soaking cocoa beans in a solution of gelatine, evaporating the mass to dryness, and crushing and grinding the mass to chocolate liquor.

2. That step in the preparation of chocolate herein described which consists in soaking cocoa-bean nibs in a solution of gelatine and sugar, evaporating the mass to dryness, and crushing the mass to chocolate liquor.

3. The preparation of chocolate which includes soaking cocoa-bean nibs in an aqueous solution of gelatine, evaporating the mass to dryness, and crushing and grinding the mass together with cocoa butter to a smooth and homogeneous product.

In testimony whereof we have hereunto set our hands.

LEWIS B. ESMOND.
WERNER W. DUECKER.